Jan. 8, 1957  R. C. STEWART  2,776,783
APPARATUS FOR REGULATING DELIVERY OF IRREGULAR MATERIAL
Filed Feb. 1, 1955  3 Sheets-Sheet 1

Inventor
ROBERT CARROL STEWART
By Young, Emery & Thompson
Attorneys

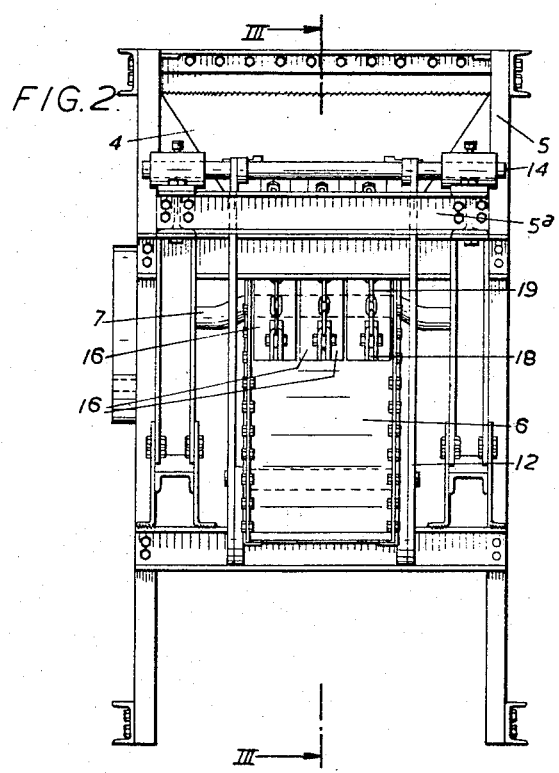

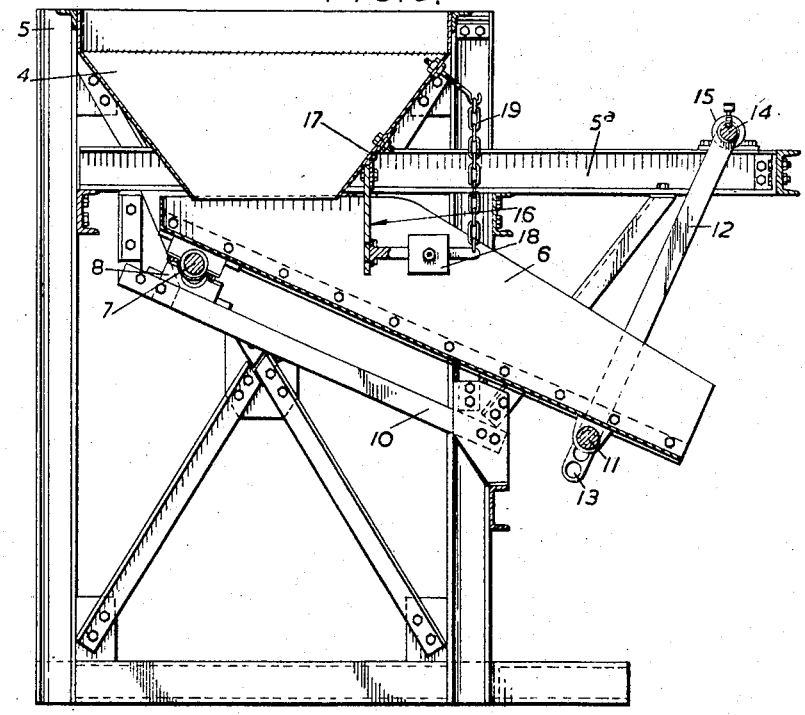

2,776,783
Patented Jan. 8, 1957

United States Patent Office

2,776,783
APPARATUS FOR REGULATING DELIVERY OF IRREGULAR MATERIAL

Robert C. Stewart, Bowling, near Glasgow, Scotland, assignor to Keir & Cawder Limited, Bishopbriggs, by Glasgow, Great Britain Application February 1, 1955, Serial No. 485,482

5 Claims. (Cl. 222—199)

This invention relates to apparatus for regulating or obtaining a more uniform delivery of irregular material. Such irregular material is commonly obtained in quarries, for example, stones, sand, gravel, earth and the like, and is often of an irregular nature comprising small particles and large lumps mixed together, while it may be supplied in irregular quantities, for example, from trucks.

An object of the present invention is to provide apparatus for effecting a relatively uniform or regular rate of delivery of such material, for example, to a conveyor or for other delivery purposes where a substantially uniform supply is desired. A conveyor will be overloaded and may become blocked unless the delivery is regulated.

In accordance with the present invention we provide apparatus for regulating delivery of irregular material, comprising in combination a hopper for receiving the material, a shaking trough supplied from said hopper, and an adjustable gate extending into said trough in order to regulate the delivery therefrom and also to yield when a relatively large lump of material tries to force its way past same.

Means may be provided for adjusting the inclination of the shaking trough so as to give a greater or lesser gravity effect on the material therein; for example, if the material is relatively sticky such as damp clayey earth, the inclination is increased.

The motion of the trough may conveniently be of a jigging or up and down vibratory movement at its end below the hopper, while at the delivery end it may be a horizontal reciprocating or to-and-fro movement.

The apparatus is preferably combined with a conveyor, for example, of the belt type, which requires a substantially uniform delivery to prevent overloading.

We will now describe an embodiment of the invention simply by way of example, with reference to the accompanying drawings, in which:

Fig. 2 is a front elevation of the apparatus of Fig. 1 looking into the trough thereof.

Fig. 3 is a vertical section on the line III—III of Fig. 2.

Figure 1:
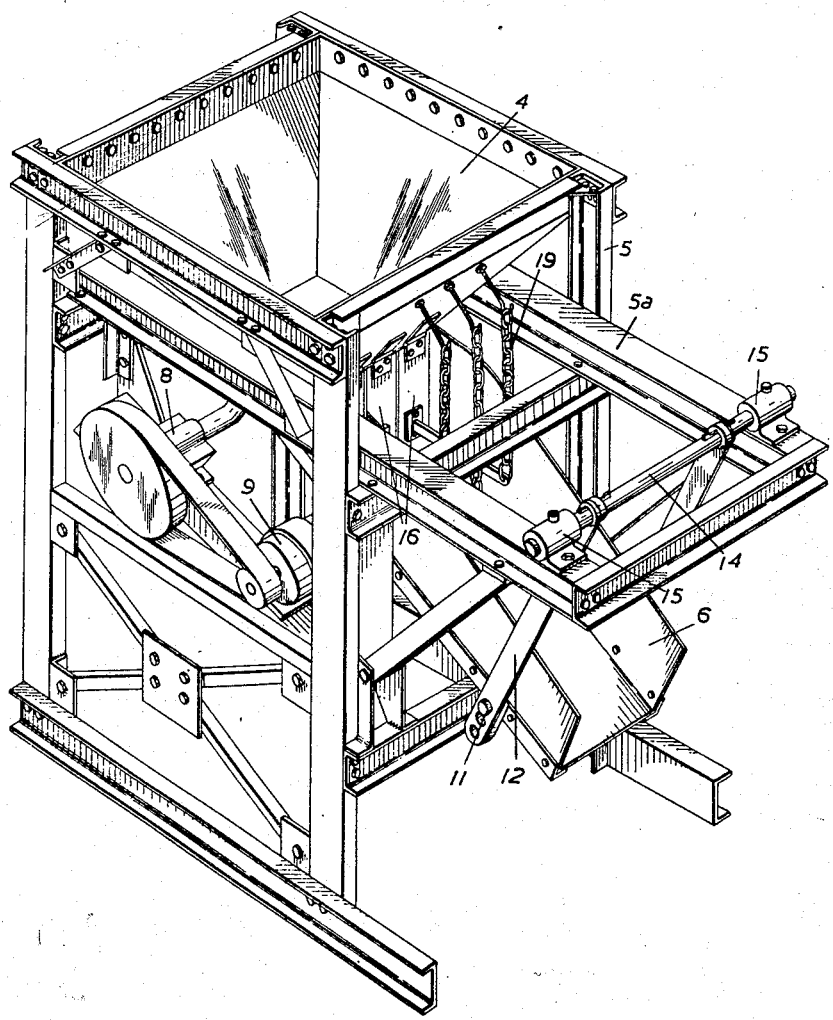
Fig. 1 is a perspective view of apparatus for regulating the delivery of irregular material.

Referring to the drawings, the apparatus comprises a hopper 4 feeding to a shaking trough 6. The hopper 4 is of inverted hollow pyramidal shape extending downwardly from the top of a supporting stand or main framework 5, and the material is loaded into said hopper in any convenient manner.

The lower part of the hopper is open and feeds into the upper end of the inclined shaking trough 6 whose upper end below the hopper is vibrated by bearing on an eccentric shaft 7 mounted on concentric end bearings 8 and driven from an electric motor 9.

The eccentric shaft and the bearings 8 as well as motor 9 are borne by an auxiliary frame 10 carried by the main frame. The lower end of the trough is mounted on rollers on a shaft 11 at the lower end of pivotally depending support arms 12, the effective length of which arms can be adjusted by a series of apertures 13 at any of which the shaft 11 may be mounted, thereby to vary the slope of the trough.

The depending arms 12 are borne on a transverse shaft 14 extending across the apparatus and provided with end bearings 15 having grease cups therefor. This cross shaft is supported on an outwardly projecting framework 5a carried by the main framework and braced by downwardly extending struts and bearing on the lower part of the main framework, and also connected to the auxiliary frame 10.

At that side of the opening in the bottom of the hopper 4 nearer the delivery end of the trough 6, a depending gate 16 is pivotally mounted at 17 on an axis transverse to the trough, and said gate extends downwardly into the trough transversely thereof. In this example the gate comprises three flaps which pivot independently about axis 17, and a weight 18 is carried on a projecting arm on each flap of the gate so as to urge same normally into a downwardly extending position, but the arrangement allows the gate to yield by swinging of a flap or flaps should a large lump of material try to force its way past same, and in this way damage is avoided. The gate may be suspended at any predetermined minimum height and angle above the trough base by means of chains 19. By raising or lowering the gate by chains 19 the quantitative delivery can be varied.

The delivery end of the trough may be mounted above the top of a belt conveyor and delivered directly thereto, and in this way the rate of delivery of material to the conveyor is substantially uniform.

I claim:

1. Apparatus for regulating delivery of irregular material comprising in combination a hopper for receiving the material, a trough supplied from the hopper, means for imparting a shaking motion to said trough, a plurality of adjustable gate flaps extending into said trough, each gate flap being independently mounted so as to yield when a relatively large lump of material impinges thereagainst, and means for positively determining the extent to which each gate flap extends into the trough, and so the rate of delivery from the latter.

2. Apparatus for regulating delivery of irregular material comprising in combination a hopper for receiving the material, a trough supplied from the hopper, means for imparting a shaking motion to said trough, means for adjusting the inclination of the trough to give a greater or lesser gravity effect on the material therein, a plurality of adjustable gate flaps extending into said trough, each gate flap being independently mounted so as to yield when a relatively large lump of material impinges thereagainst, and means for positively determining the extent to which each gate flap extends into the trough, and so the rate of delivery from the latter.

3. Apparatus for regulating delivery of irregular material comprising in combination a hopper for receiving the material, a trough supplied from the hopper, means for imparting a shaking motion to said trough, means for adjusting the inclination of the trough to give a greater or lesser gravity effect on the material therein, a plurality of adjustable gate flaps extending into said trough, each gate flap being independently mounted so as to yield when a relatively large lump of material impinges thereagainst, means for normally urging each gate flap towards a vertically depending position, and means for positively determining the extent to which each gate flap extends into the trough, and so the rate of delivery from the latter.

4. Apparatus for regulating delivery of irregular material comprising in combination a hopper for receiving the material, a trough supplied from the hopper, means for imparting a shaking motion to said trough, said means comprising an eccentric shaft for vibrating the upper end of the trough adjacent the hopper up-and-down, and means for swingably supporting the lower end of the trough so as to allow the latter to adopt a to-and-fro generally horizontal movement, means for adjusting the inclination of the trough to give a greater or lesser gravity effect on the material therein, a plurality of adjustable gate flaps extending into said trough, each gate flap being independently mounted so as to yield when a relatively large lump of material impinges thereagainst, means for normally urging each gate flap towards a vertically depending position, and means for positively determining the extent to which each gate flap extends into the trough, and so the rate of delivery from the latter.

5. Apparatus for regulating delivery of irregular material comprising in combination a hopper for receiving the material, a trough supplied from the hopper, means for imparting a shaking motion to said trough, said means comprising an eccentric shaft for vibrating the upper end of the trough adjacent the hopper up-and-down, and means for swingably supporting the lower end of the trough so as to allow the latter to adopt a to-and-fro generally horizontal movement, means for adjusting the inclination of the trough to give a greater or lesser gravity effect on the material therein, a plurality of adjustable depending gate flaps pivoted at their upper ends and extending into said trough, each gate flap being independently mounted so as to yield when a relatively large lump of material impinges thereagainst, a weight carried by each gate flap for normally urging it towards a vertically depending position, and means for positively determining the extent to which each gate flap extends into the trough, and so the rate of delivery from the latter.

References Cited in the file of this patent

UNITED STATES PATENTS

| | | |
|---|---|---|
| 400,986 | Wilson | Apr. 9, 1889 |
| 416,968 | Swing | Dec. 10, 1889 |
| 500,832 | Wolf | July 4, 1893 |
| 528,077 | Combs | Oct. 23, 1894 |